United States Patent [19]

Shafer

[11] 4,364,071

[45] Dec. 14, 1982

[54] ELECTROGRAPHIC RECORDING

[75] Inventor: Donald E. Shafer, Littleton, Colo.

[73] Assignee: Honeywell Inc., Minneapolis, Minn.

[21] Appl. No.: 201,691

[22] Filed: Oct. 29, 1980

[51] Int. Cl.³ .......................................... G01D 15/06
[52] U.S. Cl. .................................................. 346/153.1
[58] Field of Search ........................... 346/153.1, 155;
118/657–658; 324/327; 430/48, 122; 358/300

[56] References Cited

U.S. PATENT DOCUMENTS 4,316,198  2/1982  Erickson .................... 346/153.1 X Primary Examiner—John Gonzales
Assistant Examiner—Thomas H. Tarcza
Attorney, Agent, or Firm—Charles J. Ungemach

[57] ABSTRACT

In an electrographic recorder of the type wherein a dynamic toner bridge is formed between a rotating shell and a permeable strip positioned a predetermined small distance from the periphery of the shell, to define a recording station, means are provided for varying the magnetic field defining the toner bridge by varying the intensity of the defining magnetic field.

6 Claims, 2 Drawing Figures

ELECTROGRAPHIC RECORDING

CROSS REFERENCE

Cross reference is made to a copending application of Roger D. Erickson Ser. No. 152,599 filed May 23, 1980, titled "Electrographic Recording" now U.S. Pat. No. 4,316,198.

BACKGROUND OF THE INVENTION

The present invention relates to electrographic recording. More particularly, it relates to an improved means and method for controlling the toner supply for such recording.

In the above-identified copending application of Roger D. Erickson, there has been disclosed an electrographic recording system which includes means wherein toner powder having electrical and magnetic properties is carried from a hopper to a recording station by a rotatable drum or shell. The shell is rotated about a magnetic core structure which produces a magnetic field to hold the toner powder onto the surface of the shell as it rotates. At the recording station, a dynamic bridge of the toner powder is formed between the periphery of the drum or shell and a magnetically permeable member positioned a predetermined distance from the surface of the drum or shell. A record member is driven along a path between the drum and the permeable member with the reverse side of the record member in contact with the permeable member. An array of recording electrodes are positioned to be in electrical contact with the toner powder in the bridge. The record member is backed up by a platen member at least a portion of which is electrically conductive. When one or more of the electrodes is energized, a conductive path is established from the electrode, through the bridge, to the surface of the recording member and the conductive back-up platen, electrically charging the dielectric surface of a recording member to deposit toner powder thereon.

In the system described in the above-mentioned copending application of Roger D. Erickson, the toner bridge is defined by the magnetic field established between the magnetic core about which the drum or shell rotates and the fixed magnetically permeable member. It has been found that, under certain circumstances, it is desirable to be able to modify the definition of the toner bridge in accordance with varying needs.

SUMMARY OF THE INVENTION

It is, accordingly, an object of the present invention to provide an improved electrographic recording apparatus which obviates the foregoing shortcomings.

It is another object of the present invention to provide means for varying the magnetic field which defines a magnetic toner bridge.

In accomplishing these and other objects, there has been provided, in accordance with the present invention, an electrographic recording apparatus wherein the magnetic field developed between the rotating shell and the permeable member, the field which defines the toner bridge, is varied in accordance with predetermined conditions. In one form, the magnetic field is varied by changing the position of an exciting permanent magnet. In another form the magnetic field is varied by superimposing a variable electromagnetic field.

BRIEF DESCRIPTION OF THE DRAWINGS

A better understanding of the present invention may be had from the following detailed description when read in the light of the accompanying drawings in which.

DETAILED DESCRIPTION

Figure 1:
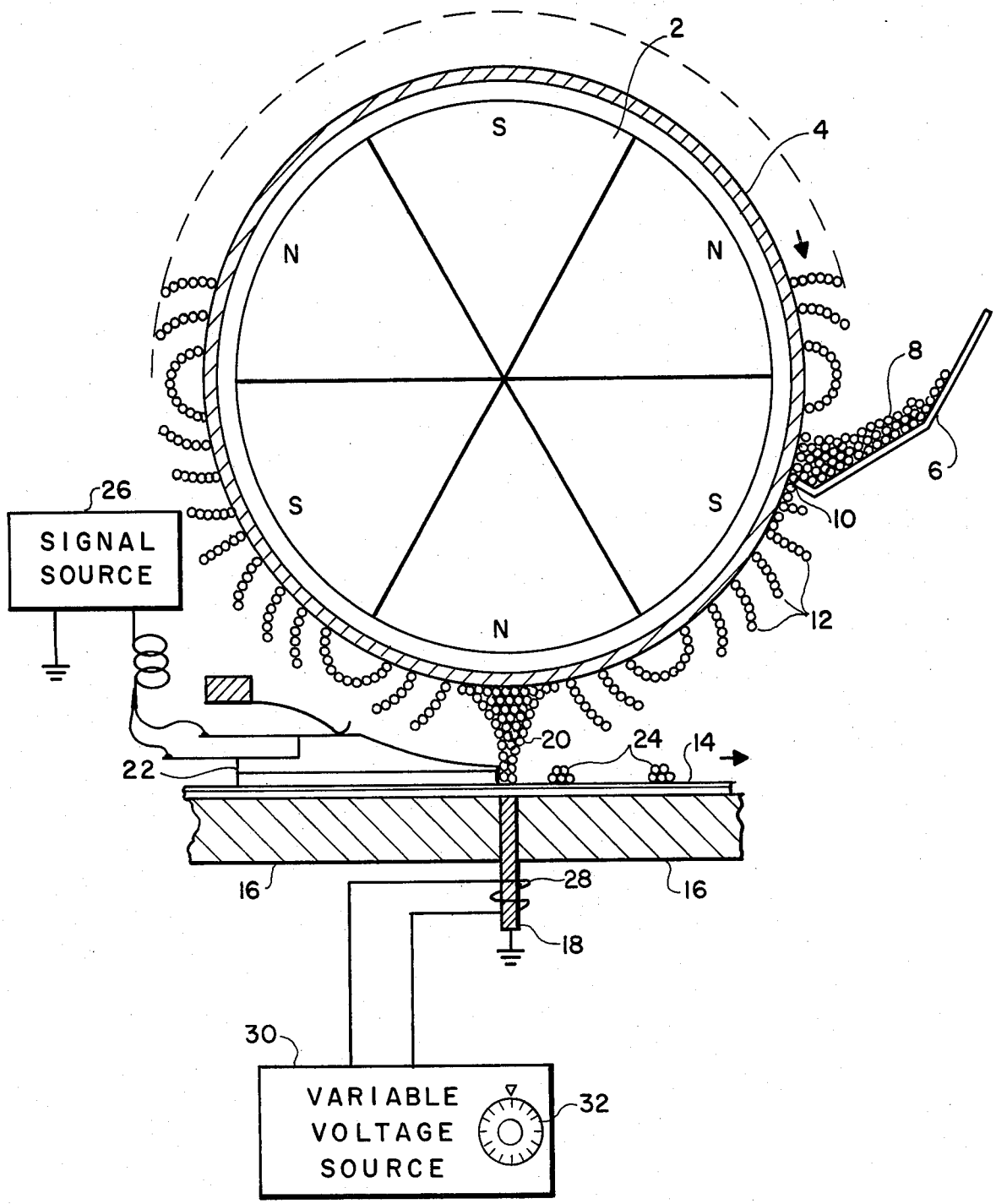
FIG. 1 is a cross-sectional view of recording apparatus embodying one form of the present invention.

Referring now to the drawings in more detail there is shown in FIG. 1 a recording system wherein a magnetic core structure 2 defines a plurality of alternate magnetic poles about the cylindrical periphery thereof. Surrounding the magnetic core structure is a cylindrical drum or shell 4 formed of non-conductive non-magnetic material. The drum is arranged to be rotationally driven about the magnetic core structure by conventional means (not herein shown). A hopper 6 is positioned adjacent the periphery of the drum 4 and is coextensive therewith. The hopper contains a quantity of toner powder 8. The toner powder is both electronically conductive and magnetically responsive in the manner shown in U.S. Pat. Nos. 3,816,840-Kotz; 3,879,337-Lunde and 3,946,402-Lunde. The magnetic fields produced by the magnetic core structure 2 causes the magnetic toner particles 8 to be attracted to the surface of the drum 4. The lower edge 10 of the hopper structure 6, the edge adjacent the periphery of the drum 4, constitutes a doctor blade for metering a predetermined quantity of the toner onto the surface of the drum 4. As the toner is moved by the rotating drum past the doctor blade 10 the toner forms whisker-like strings 12 conforming to the pattern of the magnetic fields established by the magnetic core structure 2.

Positioned adjacent to but spaced from the outer periphery of the drum 4 is means for defining a path along which a record member 14 is drawn. The record member 14 is preferably in the form of a substrate carrier which is at least slightly electrically conductive and on the surface of which is a dielectric coating. The means for defining the path for the record member 14 is a non-magnetic back plate or platen 16. Embedded in the back plate 16 or sandwiched between two segments of the back plate 16 there is positioned a thin magnetically permeable strip 18. The strip is positioned to be parallel to the axis of the drum 4 and with the narrow edge positioned at the point of nearest approach to the surface of the drum 4. This position is defined as the recording station. At least a portion of the back plate opposite the toner bridge must be electrically conductive and make electrical contact with the recording medium opposite the toner bridge; this may be the magnetically permeable strip itself. Alternatively, the back plate 16 may itself be electrically conductive. In either event, the electrically conductive portion of the back plate 16 or the electrically conductive magnetically permeable strip 18 is connected to ground.

The presence of the magnetically permeable strip 18 causes a relatively sharply defined concentration of the magnetic field produced by the magnetic core structure in the space between the drum 4 and the member 18. Since the whisker-like strings of the toner particles 12 substantially conform to the pattern of the magnetic field, a concentrated relatively sharply defined toner bridge 20 extends between the periphery of the drum 4 and the upper surface of the recording member 14. So long as the drum 4 continues to rotate, magnetic toner particles are constantly being added to and removed from the bridge 20 while the bridge 20 itself remains stably in position. This is herein referred to as a dynamic bridge. The toner particles removed from the bridge form the string-like whiskers 12 on the opposite side of the bridge and continue around the drum until they rejoin the toner 8 in the hopper 6. As the record member 14 is drawn past the end of the bridge 20, the toner particles in the bridge brush across the surface of the record member but substantially none of the toner particles are deposited on the surface of the record member since the magnetic field maintains control in the attraction of the toner particles.

In order to effect a recording of data on the record member, an array of conductive electrodes or styli 22 are positioned in the space between the drum 4 and the surface of the record member 14. The electrodes or styli are positioned to intercept and have at least the extremities thereof in physical and electrical contact with the toner in the bridge 20. When an electrical pulse is applied to one or more of the electrodes or styli 22, an electrical charge passes from the electrodes down through the toner bridge to the dielectric surface of the record member 14. That pulse results in an electrostatic charge being placed on the dielectric surface of the record member 14. The electrostatic charge overcomes the magnetic attraction of the particles and causes a deposit 24 of the toner particles on the surface of the record member 14.

In the illustrated embodiment, a signal source means 26 is shown with one set of leads connected, respectively, to the several electrodes or styli 22 and with the other lead grounded. The electrically conductive portion of the back plate 16 or the magnetically permeable strip 18 is also grounded. Thus a signal applied to the electrode 22 from a signal source 26 and through the bridge 20 effectively charges the dielectric surface of the record member 14. The opposite charge being applied through the grounded backing means and the conductive backing of the record member 14. The charges thus imposed upon the surface of the record member 14 provides an attractive force for the particles of toner from bridge 20 to overpower the magnetic attraction and thereby cause a deposit of the toner particles 24 to be imposed upon the record member 14 in the pattern of the elemental charges.

As was previously mentioned, there arises conditions under which it is desirable to change the configuration of the magnetic field in the area of the toner bridge 20. For example, it is often desirable to be able to drive the record member at any of a number of different linear speeds. When the record member is being driven at a relatively low speed, the toner bridge should be sharply defined in order to provide an unambiguous trace. On the other hand, when the record member is driven at a relatively high linear speed, it is desirable to have the toner bridge less sharply defined in order to produce a larger quantity of toner at the recording station in order that sufficient toner be transferred to the record member under the influence of the recording signals to provide an intelligible trace.

In the previously mentioned copending application of Roger D. Erickson, the permeable strip 18 was in the form of a strip of material having a fixed magnetic permeability characteristic. The polarization of the strip 18 was effected as by induction from the core structure 2. In accordance with the present invention, means are provided for superimposing a variable auxiliary magnetic field on the strip 18 from an external source. In this manner, the polarization of the strip 18 and the field strength is largely determined by the external source.

In one form of the present invention, as shown in FIG. 1, the variable magnetic field is effected electrically. To this end, a winding 28 is positioned about the permeable strip 18. While the winding is shown as being wound about a depending extension of the strip 18, the winding may be wound about the portion of the strip sandwiched between the portions of the platen 16. Alternatively, the winding may be about an auxiliary core member which is magnetically coupled to the strip 18. The terminals of the winding 28 are connected to a variable voltage source 30. The variable voltage source 30 may be manually adjusted as by a knob 32 or may be automatically adjusted by means cooperatively associated with the speed selection mechanism for the record member 14. The direction of flow of the current through the winding 28 is such as to produce a south magnetic pole of variable intensity at the upper edge of the magnetically permeable member 18. With a more intense magnetic pole produced at the upper edge of the permeable strip 18, a high intensity magnetic field will be presented between the fixed north pole of the magnetic core structure 2 and the south pole of the permeable strip 18, resulting in a sharply defined toner bridge 20. On the other hand, a low intensity magnetic pole at the upper edge of the magnetically permeable strip 18 will produce a less sharply defined magnetic field between the north pole of the fixed core structure 2 and the south pole of the permeable strip 18, thereby producing a less sharply defined toner bridge 20.

Figure 2:
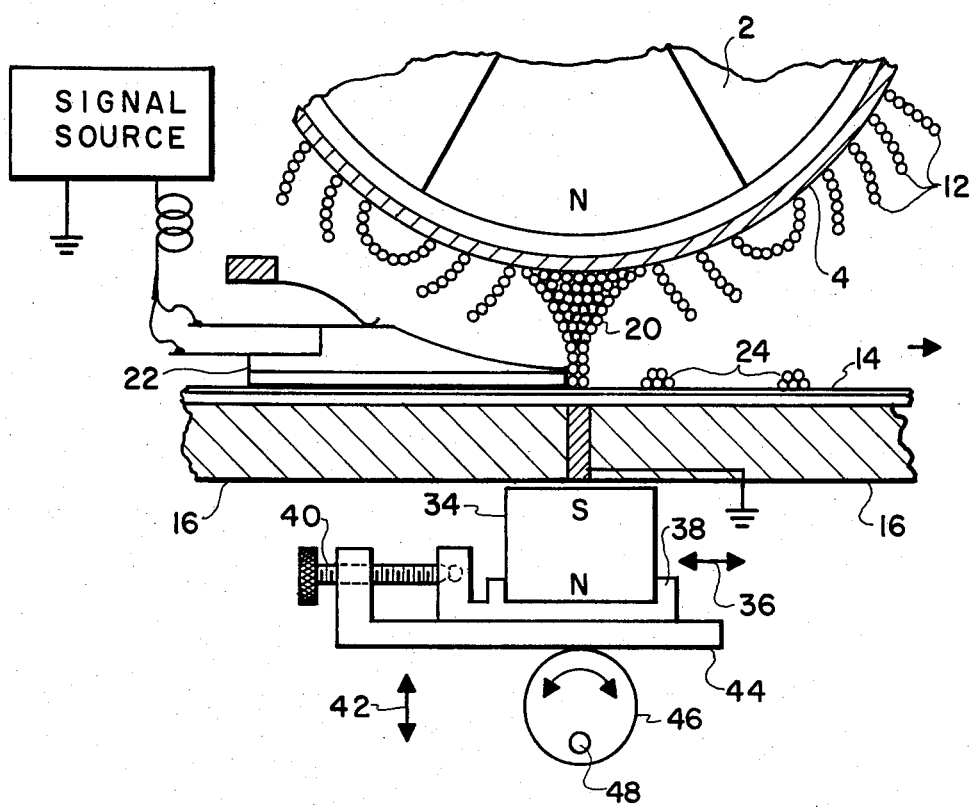
FIG. 2 is a fragmentary cross-sectional view of recording apparatus embodying a second form of the present invention.

In FIG. 2 there is shown a mechanical arrangement for effecting a variable magnetic field in the permeable strip 18. The elements shown in FIG. 2 which are identical to those shown in FIG. 1 bear the same reference numerals as the corresponding elements in FIG. 1. In FIG. 2, the permeable strip 18 is shown coextensive with the back-up platen 16. A permanent magnet 34 is positioned adjacent the lower end of the permeable strip 18. The permanent magnet 34 is mounted in such way that it may be moved linearly with respect to the platen 16 as illustrated by the arrow 36. This may be accomplished, for example, by having the permanent magnet mounted on a slide plate 38 which may be linearly adjusted by an adjusting feed screw 40. Additionally, the permanent magnet may be adjusted in a vertical direction as indicated by the arrow 42. This may be accomplished, for example, by having the slide plate 38 mounted on a base member 44 which is vertically adjustable by the movement of a cam 46 turning about a pivot point 48.

The adjustment of the permanent magnet 34 in the direction controlled by the feed screw 40 would position the magnet such that the intensity of the magnetic field might be controlled in accordance with the configuration of the flux as from the center of the magnet 34 or the fringing flux nearer the ends of the magnet 34. The adjustment of the permanent magnet 34 as by means of the cam 46, will change the intensity of the magnetic field induced into the permeable strip 18 in accordance with the inverse square of the distance between two elements. Again in this manner the intensity of the magnetic field between the permeable strip 18 and the fixed core member 2 may be varied as desired to accomodate the need accompanying the variable speed drive or the record member 14.

Thus there has been provided, in accordance with the present invention, an improved electrographic recording system which includes means for varying the magnetic field at the recording station whereby to control the sharpness of the definition of the toner bridge.

The embodiments of the invention in which an exclusive property or privilege is claimed are defined as follows:

1. An electrographic recording system for recording information on an electrographic recording medium comprising a non-magnetic platen over which said recording medium passes;

a multipolar magnetic structure;

a non-magnetic shell;

means mounting said shell for motion about said magnetic structure with the peripheral surface of said shell spaced a small predetermined distance above said platen means for supplying magnetic toner particles to the outer surface of said shell a magnetically permeable member positioned substantially in the plane of said platen and extending parallel to the rotational axis of said shell, defining a recording station, said magnetically permeable member concentrating the magnetic field produced by said magnetic structure to form a dynamic bridge of toner particles between said shell and said recording medium at said recording station;

means for superimposing a selectively variable magnetic field on said permeable member whereby to selectively vary the definition of said dynamic bridge;

a portion of said platen being electrically conductive;

an array of recording electrodes spaced between the peripheral surface of said shell and said platen with the extremities of said electrodes positioned to conduct electrical energy to said toner particles in said bridge at said recording station.

2. An electrographic recording system as set forth in claim 1 wherein said means for superimposing said variable magnetic field comprises electromagnetic means.

3. An electrographic recording system as set forth in claim 2 wherein said electromagnetic means includes a winding surrounding at least a part of said permeable member, and a selectively variable voltage source connected to said winding whereby to selectively energize said winding.

4. An electrographic recording system as set forth in claim 1 wherein said means for superimposing said variable magnetic field comprises permanent magnet means.

5. An electrographic recording system as set forth in claim 4 wherein said permanent magnet means includes a permanent magnet and means for varying the magnetic coupling between said permanent magnet and said permeable member.

6. An electrographic recording system as set forth in claim 5 wherein said means for varying said magnetic coupling includes means for moving said permanent magnet relative to said permeable member.

* * * * *